United States Patent [19]

Pöhlmann et al.

[11] Patent Number: 4,569,875
[45] Date of Patent: Feb. 11, 1986

[54] MULTILAYER WEB PANEL AND A PROCESS FOR ITS MANUFACTURE

[75] Inventors: Klaus E. Pöhlmann, Darmstadt; Heinz Vetter, Rossdorf; Ernst Friederich, Darmstadt, all of Fed. Rep. of Germany

[73] Assignee: Rohm GmbH Chemische Fabrik, Darmstadt, Fed. Rep. of Germany

[21] Appl. No.: 570,298

[22] Filed: Jan. 13, 1984

[30] Foreign Application Priority Data

Feb. 3, 1983 [DE] Fed. Rep. of Germany ... 8302842[U]

[51] Int. Cl.$^4$ .......................... B32B 3/12; B32B 27/08
[52] U.S. Cl. ..................................... 428/119; 428/188; 428/213; 428/215; 428/332; 428/412; 428/520; 428/522
[58] Field of Search ............... 428/515, 212, 213, 215, 428/412, 119, 188, 520, 522, 332

[56] References Cited

U.S. PATENT DOCUMENTS 4,242,414 12/1980 McKenzie ..................... 428/412

FOREIGN PATENT DOCUMENTS 2832676 2/1980 Fed. Rep. of Germany .
2927315 1/1981 Fed. Rep. of Germany ...... 428/119

*Primary Examiner*—Paul J. Thibodeau
*Attorney, Agent, or Firm*—Oblon, Fisher, Spivak, McClelland & Maier

[57] ABSTRACT

A multilayer web panel with improved impact resistance having two substantially flat exterior walls and webs connecting the walls as one piece. At least one exterior wall has at least two adhesively bonded layers of one or more plastics, wherein the bearing layer of the exterior wall consists of an acrylic glass layer which is about 50% or more of the total thickness of the exterior wall, and the inner side of the acrylic glass layer has a thinner inner layer which is adhesively bonded thereto and is made of a plastic with a higher elongation at rupture than that of the acrylic glass.

15 Claims, 2 Drawing Figures

MULTILAYER WEB PANEL AND A PROCESS FOR ITS MANUFACTURE

BACKGROUND OF THE INVENTION

1. Field of the Invention

This invention relates to a multilayer web panel consisting of two substantially flat exterior walls containing webs which connect the walls as one piece and wherein at least one of the exterior walls consists of at least two adhesively bonded layers of various plastics.

2. Description of the Prior Art

According to German patent DE-OS No. 28 32 676, a multilayer web panel is produced by coextrusion of an inner layer of polycarbonate plastic and an exterior layer of acrylic glass, wherein the polycarbonate plastic layer is designed as load-bearing and is substantially thicker than the acrylic glass layer which has a thickness of only 10 to 100 $\mu$m. Thicker acrylic glass layers are explicitly not recommended because of the danger of cracking in the polycarbonate plastic layer in the event of rupture in the acrylic glass layer.

The known multi-layer web panels, as a result of the extreme toughness of the load-bearing polycarbonate layer, are less sensitive to impact and are highly weather-resistant owing to the high chemical resistance of exterior acrylic glass. Because of the predominance of the polycarbonate plastic used, these web panels are substantially more expensive than those produced exclusively from acrylic glass. The latter, however, have the disadvantage of a limited impact resistance.

Hence, a need continues to exist for a less expensive web panel, such as one consisting predominantly of an acrylic glass, which has an improved impact resistance or a reduced sensitivity to impact.

SUMMARY OF THE INVENTION

Accordingly, it is an object of the present invention to provide a less expensive web panel consisting predominantly of acrylic glass having an improved impact resistance.

It is also an object of this invention to provide a less expensive web panel from thermoplastically workable homo and copolymers of methyl methacrylate of low elongation at rupture which are unalloyed with strengthening additives.

According to the present invention, the foregoing and other objects are attained by providing a multilayer web panel with improved impact resistance having two substantially flat exterior walls and webs connecting the walls as one piece, wherein at least one exterior wall has at least two adhesively bonded layers of one or more plastics, wherein the bearing layer of the exterior wall has an acrylic glass making up about 50% or more of the total thickness of the exterior wall, and wherein a thinner inner layer of a plastic having a higher elongation at rupture than that of the acrylic glass is placed at the inner side of the acrylic glass layer.

DETAILED DESCRIPTION OF THE PREFERRED EMBODIMENTS

According to the present invention, it is now possible to provide a less expensive multilayer web panel, consisting predominantly of acrylic glass, which has an improved impact resistance.

Figure 1:
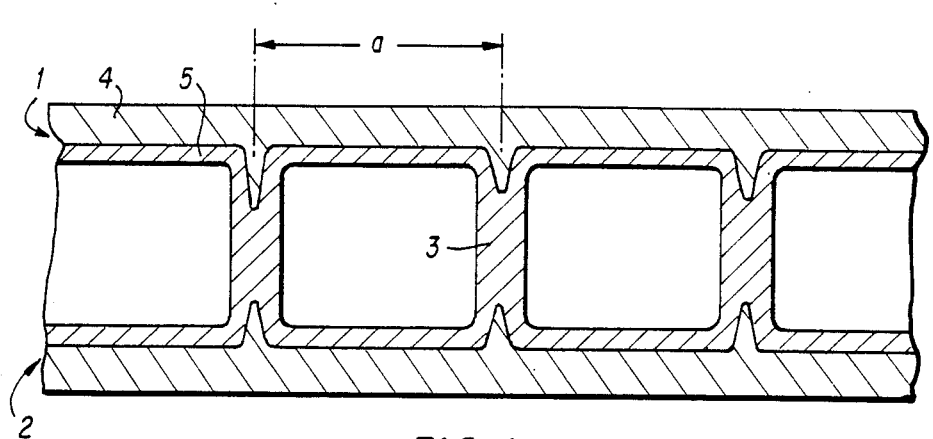
FIG. 1 illustrates a partial cross sectional view of the multilayer web panel according to the present invention.

In the partial cross sectional view of the present invention in FIG. 1, at least the exterior wall (1), preferably both exterior walls (1) and (2), certain a bearing layer (4) of an acrylic glass, whose thickness is about 50% or more of the total outer wall thickness (1) or (2). It may be about 0.6 to 3 mm thick. A layer (5) of a plastic of higher impact resistance than that of the acrylic glass of the layer (4) is placed on the inner side of the exterior wall (1) or (2). It is thinner than the acrylic glass layer (4), e.g. about 0.05 to 0.5, preferably about 0.1 to 0.2 mm thick.

The webs (3), which can be preferably perpendicular to the exterior walls (1,2), but which can also be arranged diagonal to the latter, can consist in part of the above mentioned acrylic glass and in part of the plastic of higher elongation at rupture.

The total thickness of the web panel can amount to about 6 to 60 mm. The webs (3) are of approximately the same thickness as the exterior walls and can have spaces (a) corresponding to the same or double the total thickness, preferably about 6 to 120 mm. The thickness of the webs and the exterior walls should advantageously be about 1/20 to 1/5 of the total thickness. The total width (crosswise to the webs) can, e.g., be about 30 to 200 cm, preferably 50 to 200 cm. The length (in the direction of the webs) is arbitrary; commercial lengths amount to about 2 to 20 m.

By acrylic glass is understood—unless specifically indicated otherwide—thermoplastically workable, particularly extrudable homo- and copolymers of methyl methacrylate of low elongation at rupture, e.g. about 3 to 4%, these being unalloyed with strengthening additives, whereby the proportion of the methyl methacrylate comprises more than about 90 percent by weight. Comonomers are, e.g. other alkyl esters of methacrylic acid or alkyl esters of acrylic acid. In general, while the acrylic glass might contain some additives of ultraviolet protective means or a slip additive, for example; colorless, transparent or only lightly clouded materials are preferred.

The diminished impact sensitivity of the web panels according to the invention derives from the enhanced elongation at rupture of the plastic from which the thin inner layer (5) is made up. Surprisingly, the impact sensitivity is already significantly reduced if the elongation at rupture of the plastic of the inner layer is approximately 1 to 2% (absolute) higher than that of the acrylic glass. It is preferably in the range of more than about 5% and can amount to 100% while the elongation at rupture of the acrylic glass is, in general, below about 5%. The proportion of the elongation at rupture of the two plastics is, as a rule, above about 1.3:1.

The plastic of greater elongation at rupture must also be thermoplastically workable, particularly coextrudable with the acrylic glass. Good adhesion to the acrylic glass is also important. The preferred plastics are polycarbonates, especially those from the aromatic bisphenols such as bisphenol A, built-up plastics, as well as acrylic glass types with enhanced greater elongation at rupture. These include copolymers of less than about 90 percent by weight of methyl methacrylate and more than about 10, preferably about 15-30 percent by weight of alkyl acrylate (1 to about 8 carbon atoms in the alkyl radical) and alloyed acrylic glass types with an additive enhancing impact resistance. Such materials are known, e.g. from DE-AS No. 2 253 689. Said acrylic glass types with enhanced elongation at rupture do not fall under the meaning of "acrylic glass" in the sense used above.

Figure 2:
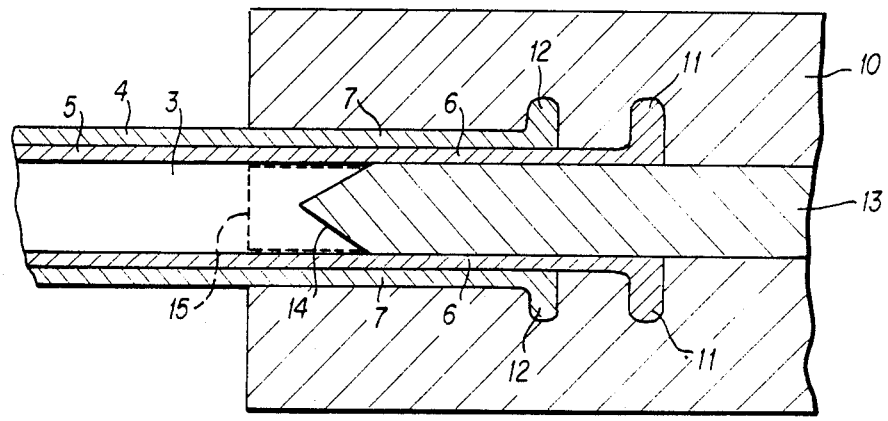
FIG. 2 illustrates a cross sectional view through a device for the production of the multilayers web panel according to the present invention.

Production is performed advantageously by coextrusion of both layers (4) and (5). For this purpose two double extrudates (6,7) are formed in a multicomponent nozzle (10) fed by two extruders. Using one extruder, thermoplastic extrudates (6) of the plastic with higher elongation at rupture are produced from the distribution channels (11) and, using a second extruder, thermoplastic extrudates (7) of the acrylic glass are produced from the distribution channels (12). One side of at least one of the extrudates is deformed while forming the webs, and then the two extrudates are joined adhesively to form double extrudates (6,7), whereby the partial extrudate (6) of the plastic with higher elongation at rupture adjoins the core (13) of the multicomponent nozzle (10). In the zone where the core (13) phases into divided core pieces (15, shown in FIG. 2 by broken lines) through openings (14), molding material from the partial extrudates (6) enters the opening (14) and at that point flows together to the webs (3).

Both plastics are involved in the formation of the webs. Their distribution in the webs depends upon the quantative relationship of the two types of plastics, upon the rheological properties of their melts and upon the geometry of the nozzle.

If only one side of the web panel is intended to have a reduced impact sensitivity, it is sufficient if one double extrudate of the type described is produced and the second molding material extrudate is formed solely from the acrylic glass.

After leaving the mouth of the nozzle, the extrudate passes through a vacuum forming channel in a known way, within which it is cooled below the softening temperature. It is finally cut to panels of the desired length by conventional methods.

Having now fully described the invention, it will be apparent to one of ordinary skill in the art that many changes and modifications can be made thereto without departing from the spirit and scope of the invention as set forth herein.

What is claimed as new and desired to be secured by Letters Patent of the United States is:

1. A multilayer web panel with improved impact resistance comprising two substantially flat exterior walls and webs connecting said exterior walls as one piece, wherein at least one exterior wall consists of at least two adhesively bonded layers of one or more plastics, wherein the bearing layer of said exterior wall consists of an acrylic glass comprising about 50% or more of the total thickness of said exterior wall and wherein a thinner inner layer of a plastic having an elongation which is at least 1% higher at rupture than that of said acrylic glass is placed at the inner side of the acrylic glass layer in contact therewith.

2. The multilayer web panel as in claim 1, wherein the elongation at rupture of the plastic of the inner layer is at least 1 to 2% greater than that of said acrylic glass.

3. The multilayer web panel as in claim 2, wherein the plastic of the inner layer having the higher elongation at rupture has an elongation of rupture in the range of 5 to 100%.

4. The web multilayer web panel as in claim 2, wherein the ratio of the elongation at rupture of the plastic having the higher elongation at rupture to that of the acrylic glass is greater than about 1.3:1.

5. The multilayer web panel as in claim 1, wherein the plastic having the higher elongation at rupture is a polycarbonate plastic or an acrylic glass having enhanced elongation at rupture.

6. The multilayer web panel as in claim 5, wherein the polycarbonate plastic is bisphenol A polycarbonate.

7. The multilayer web panel as in claim 5, wherein the acrylic glass having enhanced elongation at rupture comprises copolymers having less than about 90% by weight of methyl methacrylate and more than about 10% by weight of alkyl acrylate, wherein the alkyl group has 1 to about 8 carbon atoms.

8. The multilayer web panel as in claim 7, wherein about 15 to 30% by weight of alkyl acrylate is used.

9. The multilayer web panel as in claim 5, wherein the acrylic glass having enhanced elongation at rupture is an acrylic glass alloyed with an additive which enhances impact resistance.

10. The multilayer web panel as in claim 1, wherein said bearing layer is about 0.6 to 3 mm in thickness.

11. The multilayer web panel as in claim 1, wherein said thinner inner layer has a thickness of about 0.05 to 0,5 mm.

12. The multilayer web panel as in claim 11, wherein said thinner inner layer has a thickness of about 0.1 to 0.2 mm.

13. The multilayer web panel as in claim 1, wherein the total thickness of the web panel is about 6 to 60 mm.

14. The multilayer web panel as in claim 1, wherein the thickness of the webs and exterior walls are about 1/20 to 1/5 of the total thickness.

15. The multilayer web panel as in claim 1, wherein the total width, crosswise to the webs, is about 30 to 200 cm.

* * * * *